United States Patent
Trede et al.

(10) Patent No.: US 11,480,159 B2
(45) Date of Patent: Oct. 25, 2022

(54) MAINFRAME FOR WIND TURBINES

(71) Applicant: Senvion GmbH, Hamburg (DE)

(72) Inventors: Alf Trede, Immenstedt (DE); Carsten Eusterbarkey, Simonsberg (DE)

(73) Assignee: Senvion GmbH, Hamburg (DE)

( * ) Notice: Subject to any disclaimer, the term of this patent is extended or adjusted under 35 U.S.C. 154(b) by 46 days.

(21) Appl. No.: 16/367,703

(22) Filed: Mar. 28, 2019

(65) Prior Publication Data

US 2019/0301436 A1   Oct. 3, 2019

(30) Foreign Application Priority Data

Mar. 28, 2018 (DE) ..................... 10 2018 002 553.6

(51) Int. Cl.
*F03D 80/70* (2016.01)
*F03D 13/20* (2016.01)
(Continued)

(52) U.S. Cl.
CPC ............. *F03D 80/70* (2016.05); *F03D 13/20* (2016.05); *F03D 15/10* (2016.05); *F03D 80/88* (2016.05);
(Continued)

(58) Field of Classification Search
CPC .......... F03D 80/70; F03D 80/88; F03D 13/20; F03D 15/10; F16H 57/025; F16H 57/028
See application file for complete search history.

(56) References Cited

U.S. PATENT DOCUMENTS 6,232,673 B1 *   5/2001   Schoo ..................... F03D 15/10
                                                                    290/55
6,879,055 B2 *   4/2005   Becker .................... F03D 13/10
                                                                    290/55
(Continued)

FOREIGN PATENT DOCUMENTS

CN         105201754        12/2015
DE          4104454          7/1992
(Continued)

OTHER PUBLICATIONS

Young and Budynas, Roark's Formulas for Stress and Strain, 2002, McGraw-Hill Companies Inc., Seventh Edition pp. 304-310 (Year: 2002).*

(Continued)

*Primary Examiner* — Courtney D Heinle
*Assistant Examiner* — Michael K. Reitz
(74) *Attorney, Agent, or Firm* — Alix, Yale & Ristas, LLP

(57) ABSTRACT

A mainframe mounts the drivetrain of a wind turbine, and to an arrangement comprising such a mainframe, and to a wind turbine having a corresponding arrangement. For the purpose of mounting the drivetrain of a wind turbine, the mainframe is realized with two bearing points that are spaced apart from each other, a partial flange, having a fastening region shaped as a circular ring segment, being provided at at least one bearing point. The arrangement comprises, besides the mainframe, at least one ring element configured to radially encompass the drivetrain. At least one ring element is fastened to the fastening region, shaped as a circular ring segment, of a bearing point of the mainframe. In the case of the wind turbine, the drivetrain is mounted by means of the described arrangement.

17 Claims, 4 Drawing Sheets

(51) Int. Cl.
*F03D 80/80* (2016.01)
*F03D 15/10* (2016.01)
*F16H 57/025* (2012.01)
*F16H 57/028* (2012.01)

(52) U.S. Cl.
CPC ......... *F16H 57/025* (2013.01); *F16H 57/028* (2013.01); *F05B 2240/54* (2013.01); *F05B 2240/90* (2013.01); *F05B 2260/96* (2013.01)

(56) References Cited

U.S. PATENT DOCUMENTS

| | | | |
|---|---|---|---|
| 7,771,308 B2* | 8/2010 | Willie | F03D 15/00 475/347 |
| 8,779,619 B2* | 7/2014 | Liingaard | F03D 13/20 290/55 |
| 10,823,155 B2 | 11/2020 | Wu et al. | |
| 2003/0080566 A1* | 5/2003 | Becker | F03D 7/0204 290/55 |
| 2007/0265133 A1* | 11/2007 | Smook | F03D 80/70 475/317 |
| 2010/0140952 A1* | 6/2010 | Jansen | F03D 15/10 290/55 |
| 2010/0219642 A1* | 9/2010 | Kim | F03D 9/25 290/55 |
| 2012/0025538 A1* | 2/2012 | Luneau | F03D 80/80 290/55 |
| 2012/0134811 A1 | 5/2012 | Bagepalli et al. | |
| 2013/0302144 A1* | 11/2013 | Demtroder | F03D 13/10 415/124.2 |
| 2014/0010664 A1* | 1/2014 | Markussen | F03D 80/80 416/244 R |
| 2014/0212290 A1* | 7/2014 | Remmerie | F03D 15/00 416/170 R |
| 2014/0314580 A1* | 10/2014 | Lind | F03D 80/00 416/244 R |
| 2015/0139583 A1* | 5/2015 | Kullin | F16C 23/086 384/558 |
| 2016/0020667 A1* | 1/2016 | Jensen | F03D 80/88 290/55 |

FOREIGN PATENT DOCUMENTS

| | | |
|---|---|---|
| DE | 10247072 | 4/2004 |
| DE | 102006027543 | 12/2007 |
| EP | 1251306 | 10/2002 |
| WO | WO9703288 | 1/1997 |
| WO | WO2011051369 | 5/2011 |
| WO | WO2012119603 | 9/2012 |
| WO | WO2013185768 | 12/2013 |

OTHER PUBLICATIONS

Search Report.

* cited by examiner

A - A

MAINFRAME FOR WIND TURBINES

BACKGROUND

The invention relates to a mainframe for mounting the drivetrain of a wind turbine, and to an arrangement comprising such a mainframe, and to a wind turbine having a corresponding arrangement.

In the case of known wind turbines, a rotor that can be rotated about a substantially horizontal axis can be put into rotation by wind. In the case of a usual structural design, the rotor in this case is fixedly connected to a rotor shaft and thereby, possibly via an intermediate gearbox, to a generator for the purpose of converting the rotational energy of the rotor into electrical energy. The rotating components from the rotor to the generator are referred to as a drivetrain.

For the purpose of mounting it is known, as one of a plurality of variants, to mount the drivetrain of the wind turbine by means of a so-called three-point mounting (see, for example, DE102006027543A1). In this case the rotor shaft is mounted by a front bearing arranged close to the region of connection to the rotor, and in the rear region is coupled to the gearbox, which is fastened, at two lateral gearbox supports, to the mainframe of the wind turbine. In the case of such a three-point mounting, the rotor shaft is supported, in particular in respect of flexural loading, via the bearings of the gearbox.

As an alternative to this, also known to persons skilled in the art are the four-point mounting (see, for example, WO2011/051369A2), the moment mounting (see, for example DE10247072A1) and the trunnion mounting.

In the case of almost all known mounting variants, the forces and moments introduced via the mounting into the support structure of the nacelle of the wind turbines result in deformations of precisely this support structure. In order to counteract these deformations, various stiffening mechanisms are proposed and applied, which, however, normally result in an increased weight of the support structure. In the case of the trunnion mounting, frequently only a comparatively slight deformation of the support structure occurs; however, except in the case of a direct-drive wind turbine, a separate shaft is required to transmit the torque to the generator.

SUMMARY

An improved support structure for the drivetrain of a wind turbine is created.

Accordingly, the invention relates to a mainframe for mounting the drivetrain of a wind turbine, comprising two bearing points that are spaced apart from each other. A partial flange, having a fastening region shaped as a circular ring segment, is provided at at least one bearing point.

An arrangement for mounting the drivetrain of a wind turbine comprises a mainframe, and at least one ring element designed to radially encompass the drivetrain. At least one ring element is fastened to the fastening region shaped as a circular ring segment of a bearing point of the mainframe.

A wind turbine has a drivetrain that comprises a rotor shaft and a gearbox. The drivetrain is mounted by means of a disclosed arrangement.

Since the mainframe has a partial flange, having a fastening region shaped as a circular ring segment, at at least one bearing point, the loads introduced into the mainframe via this bearing point can be introduced in a distributed manner over a large area. Consequently, there are not expected to be any locally focussed load peaks, which either result in large deformations or, alternatively—in order to limit the deformation—require a solid structural design of the support structure. Since the introduction of load into the mainframe is distributed over a large area, the dimensioning of the latter can be correspondingly smaller and lighter.

Force can be introduced from a partial flange into the mainframe to be effected close to the fastening of the mainframe to the tower, thereby enabling twisting of the mainframe to be reduced significantly.

It is preferred that if the fastening region is shaped as a circular ring segment and/or the partial flange of at least one bearing point comprising an angular segment of from 30° to 280°, preferably 40° to 200°, more preferably 80° to 180°. If the fastening region extends over corresponding angular ranges, a good load distribution can be achieved. In addition, owing to a large angular range of the fastening region, a ring element fastened thereto can be stiffened. If the angular segment of the fastening region and/or the partial flange is limited to 180°, a ring element, or a drivetrain, or the part of a drivetrain having a ring element mounted thereon can furthermore be inserted, in the radial direction, into the corresponding bearing point of the mainframe. The mounting known, for example, from the three-point mounting, of a drivetrain pre-mounted together with a bearing, in which the drivetrain is inserted from above into the support structure, which is of an open structural design and likewise pre-mounted, is thus likewise possible. The axis of the fastening region, shaped as a circular ring segment, and/or of the partial flange is preferably aligned in such a manner that, when the mainframe is in a state of use, it is substantially parallel to an axis of the drivetrain and/or coincides with a corresponding axis.

It is preferred that if the fastening region shaped as a circular ring segment has a radial stop face, it is shaped as a circle segment, for the ring element. The ring element is then not only to be connected to the fastening region shaped as a circular ring segment, but may also bear against the radial stop face provided there. Loads that act as contact pressure forces from the ring element upon the radial stop face can thus be diverted particularly effectively and directly into the mainframe.

As an alternative to this it is also possible for the partial flange to have a radial stop face for the ring element that is shaped other than as a circle segment, preferably being elliptical or trough-shaped. While the loads acting as contact pressure forces upon this face can still be diverted effectively, a shape other than the circular shape of the fastening region enables rotational moments of the drivetrain to be absorbed directly via the radial stop face—clearly, provided that the ring element also has a corresponding shape.

The fastening region shaped as a circular ring segment may have a multiplicity of drilled holes, preferably arranged in a radial drill pattern, for axial screwed connection to the ring element. By means of the multiplicity of drilled holes it is possible to create a separable connection between the mainframe and the ring element that distributes the load in an effective manner over the fastening region.

In the case of the arrangement, at least one ring segment is provided, which is fastened to a fastening region of the mainframe that is provided for this purpose. The at least one ring segment is designed to radially encompass the drivetrain of a wind turbine. In other words, when the arrangement and the drivetrain are in a fully mounted state, the ring segment thus lies around precisely this drivetrain in the form of a ring frequently around the rotor shaft and coaxially with the latter. It is preferred if the arrangement comprises two ring elements which are each fastened to a bearing point of the mainframe that it is designed as described.

The one ring segment, or at least one of the two ring segments, may be realized as a bearing housing having a bearing seat, for example for a rotor-shaft bearing. A corresponding bearing, normally a roller bearing, preferably a pendulum bearing, cylinder bearing, tapered roller bearing or toroidal bearing, can accordingly be arranged in the bearing seat. As an alternative to a roller bearing, a sliding-contact bearing may also be provided. If a complete mounting of the drivetrain, and in particular of the rotor shaft, in the manner of a four-point mounting is sought by means of corresponding bearings, both ring segments may also be designed as a bearing housing, each having a bearing seat.

It is also possible, however, that a ring element is designed as a fastening frame for a gearbox. In this case, the drivetrain is first rotatably mounted in the gearbox by means of a bearing, the gearbox housing, and the bearing seat integrated therein being fastened to the fastening frame. If, for example, a further ring element is provided and realized, as previously described, as a bearing housing, a mounting that is comparable to the three-point mounting is obtained with a ring element as a fastening frame.

Elastic coupling elements, for vibration decoupling of the gearbox, may be provided at the fastening frame. The coupling elements may be realized, for example, as so-called ultra bushes, in which two concentrically arranged bushes are connected to each other via an elastically deformable intermediate-space filling. If, for example, the outer sleeve is pressed into the fastening frame or otherwise fixedly connected to the latter, a screw-bolt connection acting on the inner sleeve can move relative to the fastening frame to the extent defined by the intermediate-space filling and thus decouple, for example, vibrations. Alternatively, it is possible to provide elastically deformable spacers between the fastening frame and the gearbox, and to make the fastening of the gearbox to the fastening frame movable in such a manner that the spacers decouple the vibrations of the gearbox from the fastening frame.

A ring element—irrespective of its ultimate design—may have an axial stiffening rib. Clearly, it is also possible to provide a plurality of stiffening ribs. A radial stiffening may also be provided, in particular, in the regions of a ring element that are not intended for direct connection to the fastening region of a bearing point of the mainframe, whereby a certain stiffening is usually already achieved (see above).

It is preferred that the at least one ring element is connected to the mainframe by screwed connection, in particular by means of pre-loadable threaded bolts. A separable connection is thereby achieved which, particularly in the case of a plurality of threaded bolts, ensures a particularly well distributed introduction of force from the ring element into the mainframe.

The arrangement furthermore preferably comprises a drivetrain of a wind turbine wherein at least one ring element is arranged coaxially around the rotor shaft of the drivetrain.

For explanation of the wind turbine, reference is made to the preceding statements.

BRIEF DESCRIPTION OF THE DRAWINGS

The invention is now explained exemplarily on the basis of a preferred embodiment with reference to the appended drawings. There are shown.

DETAILED DESCRIPTION

Figure 1:
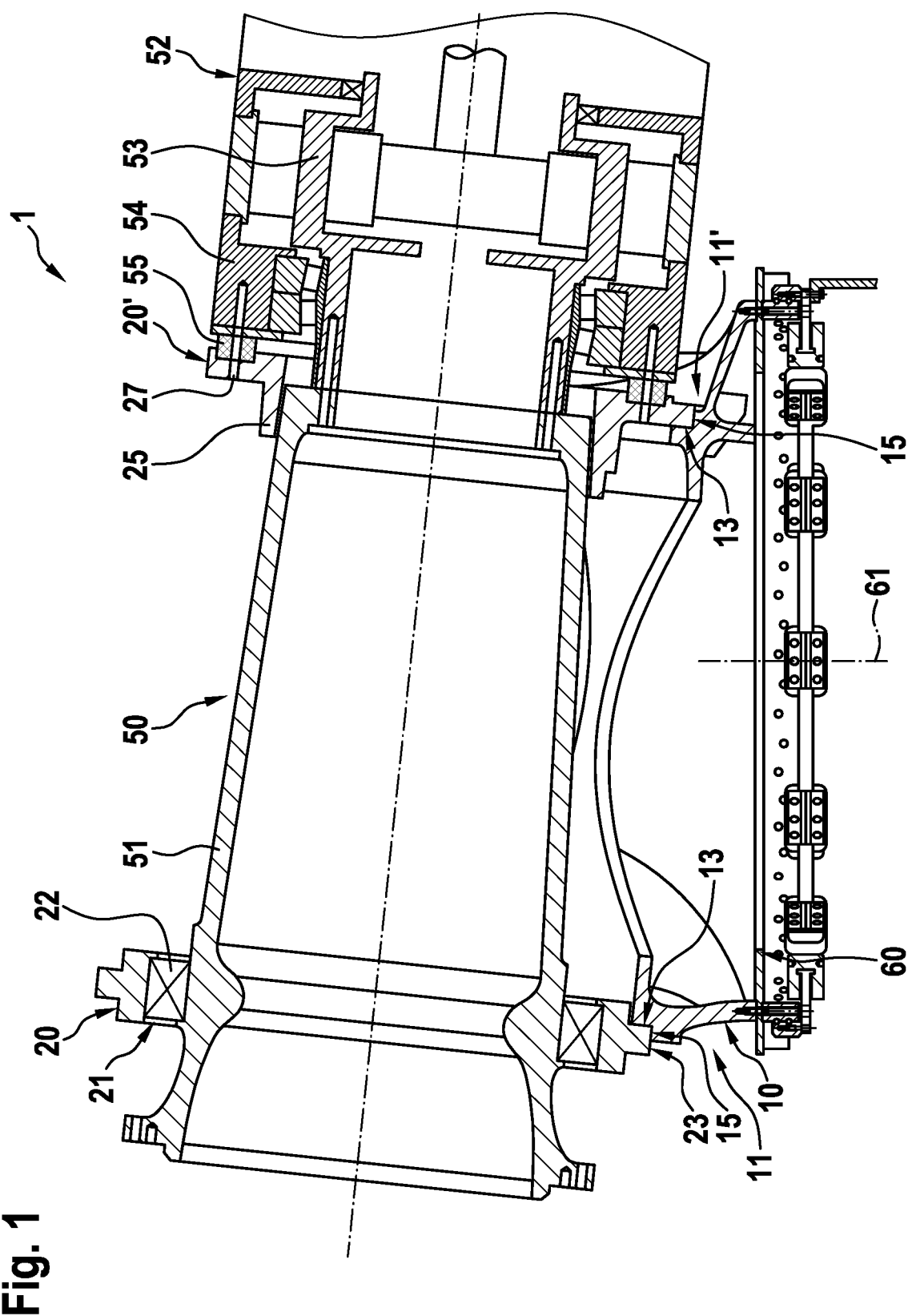
FIG. 1 is a sectional view through a first exemplary embodiment of an arrangement.

Represented schematically in FIG. 1 is an arrangement 1 for mounting the drivetrain 50 of a wind turbine. Of the drivetrain 50 of the wind turbine, only the rotor shaft 51 and, partially, the gearbox 52 connected thereto are represented in FIG. 1. The gearbox 52 is a planetary gearbox, the planetary carrier 53 of which is fixedly connected to the rotor shaft. Not represented is the actual rotor, comprising the rotor blades at the end of the rotor shaft 51 that is opposite to the gearbox 52, and the generator, arranged at the end of the gearbox 52 that is not represented.

The drivetrain 50 is mounted by the arrangement 1 of the mainframe 10 and two ring elements 20, 20' fastened thereto.

Figure 2:
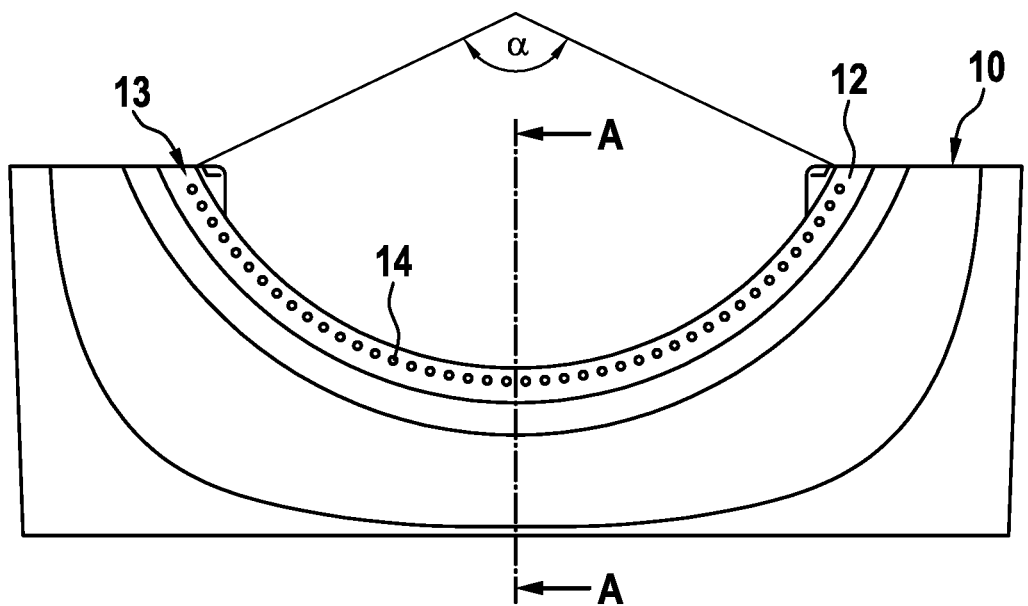
FIG. 2 is a detail view of the mainframe of the arrangement from FIG. 1.
Figure 2:
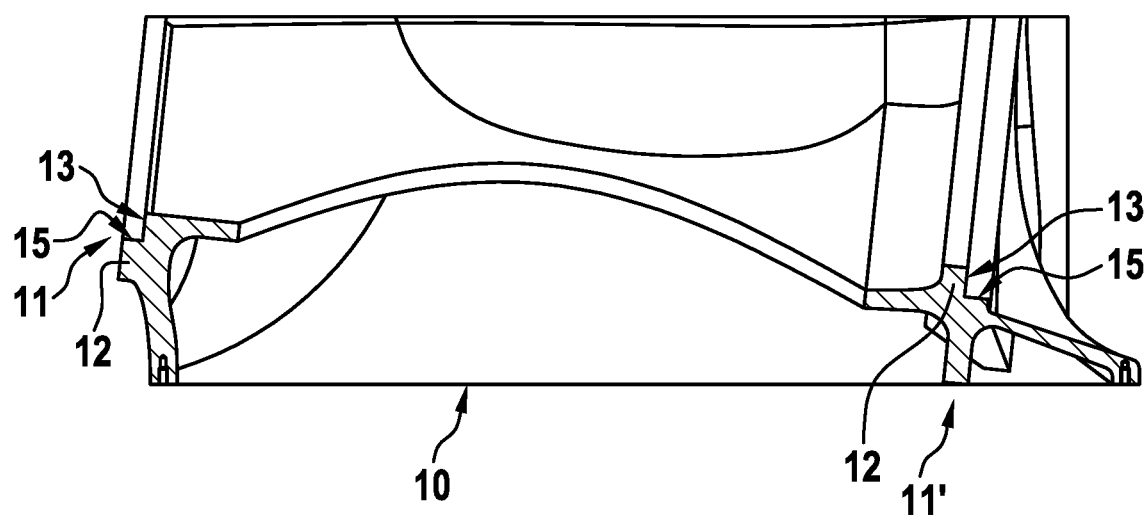

The mainframe 10—which is additionally represented in isolation and in detail in FIG. 2—has two bearing points 11, 11' which are spaced apart from each other, and fastened to each of which is a ring element 20, 20'. For the purpose of fastening, at each bearing point 11, 11', the mainframe has a partial flange 12 comprising, in this exemplary embodiment, a fastening region 13 shaped as a circular ring segment which, in each case, has a multiplicity of drilled holes 14 in the axial direction, and thus in the direction parallel to the axis of the drivetrain 50, which are arranged in a radial drill pattern. The drilled holes 14 each have an internal thread, such that the ring elements 20, 20', which each have a corresponding drill pattern of through-holes 24 (see FIGS. 3 and 4), can be fastened to the mainframe 10 by means of an array of screws. The drill pattern of the bearing point 11' is not represented in FIGS. 1 and 2, but is directly evident from the corresponding drill pattern of the ring element 20' fastened there (see FIG. 4).

The angular segment of the partial flange 12 or of the fastening region 13 of the one bearing point 11 comprises, as indicated as the angle α in FIG. 2, approximately 130°, while the angular segment of the partial flange 12 or of the fastening region 13 of the other bearing point 11' (not represented) comprises approximately 150°.

Arranged directly on the fastening regions 13 shaped as a circular ring segment there is a respective radial stop face 15 shaped as a circle segment, against which or on which the respective ring element 20, 20' lies (see FIG. 1). As a consequence, in particular the weight forces of the drivetrain 50 are introduced directly and immediately into the mainframe 10, not via the axial screwed connection to the fastening regions 13, but rather via the radial stop faces 15.

In departure from the embodiment represented, it may be advantageous to arrange the radial stop faces 15 separately and/or at a distance from the respective fastening region 13 in such a manner that the flow of force via the radial stop faces 15 is not taken past the through-holes 24. This may be achieved, for example, if a radial stop face 15 is arranged opposite the through-holes 24 and on the inside with respect to the axis of the fastening region 13 shaped as a circular ring segment. Deformations and resultant minimal movements of the respective ring element 20, 20' can thereby be kept away to a considerable extent from the screwed connection.

Figure 3:
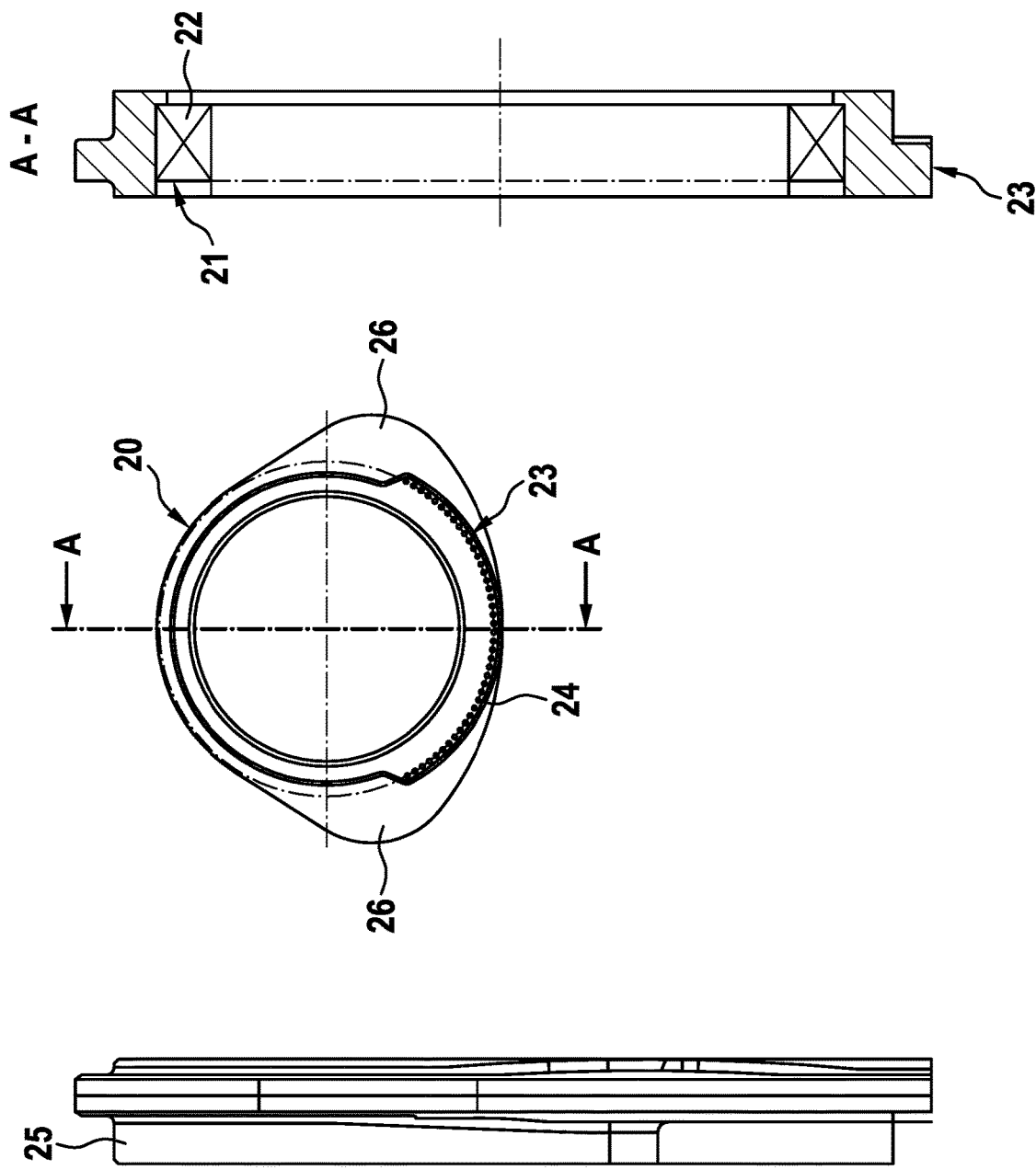
FIG. 3 is a detail view of the one ring element of the arrangement from FIG. 1.

Represented in FIG. 3 is the one ring element 20 of the arrangement 1 from FIG. 1. The ring element 20 is designed as a bearing element for rolling bearings 22 realized as floating bearings, for example a toroidal roller bearing, and has a corresponding bearing seat 21.

The ring element 20 has a stop face 23, which is matched to the shape of the stop face 15 of that bearing point 11 of the mainframe 10 at which the ring element 20 is to be fastened. Provided adjacently to this stop face 23 is a radial pattern of axial drilled through-holes 24 that is likewise matched to the corresponding pattern of drilled holes 14 on the mainframe 10. The ring element 20 can consequently be securely fastened to the mainframe 10 by an array of screws or bolts in such a manner that an advantageous load distribution is achieved in the introduction of force into the mainframe 10.

The ring element 20 has an axial stiffening rib 25. In addition, the ring element 20 is also widened in regions in the radial direction with stiffening ribs 26, whereby a radial stiffening of the particularly stressed regions of the ring element 20 can be achieved.

Figure 4:
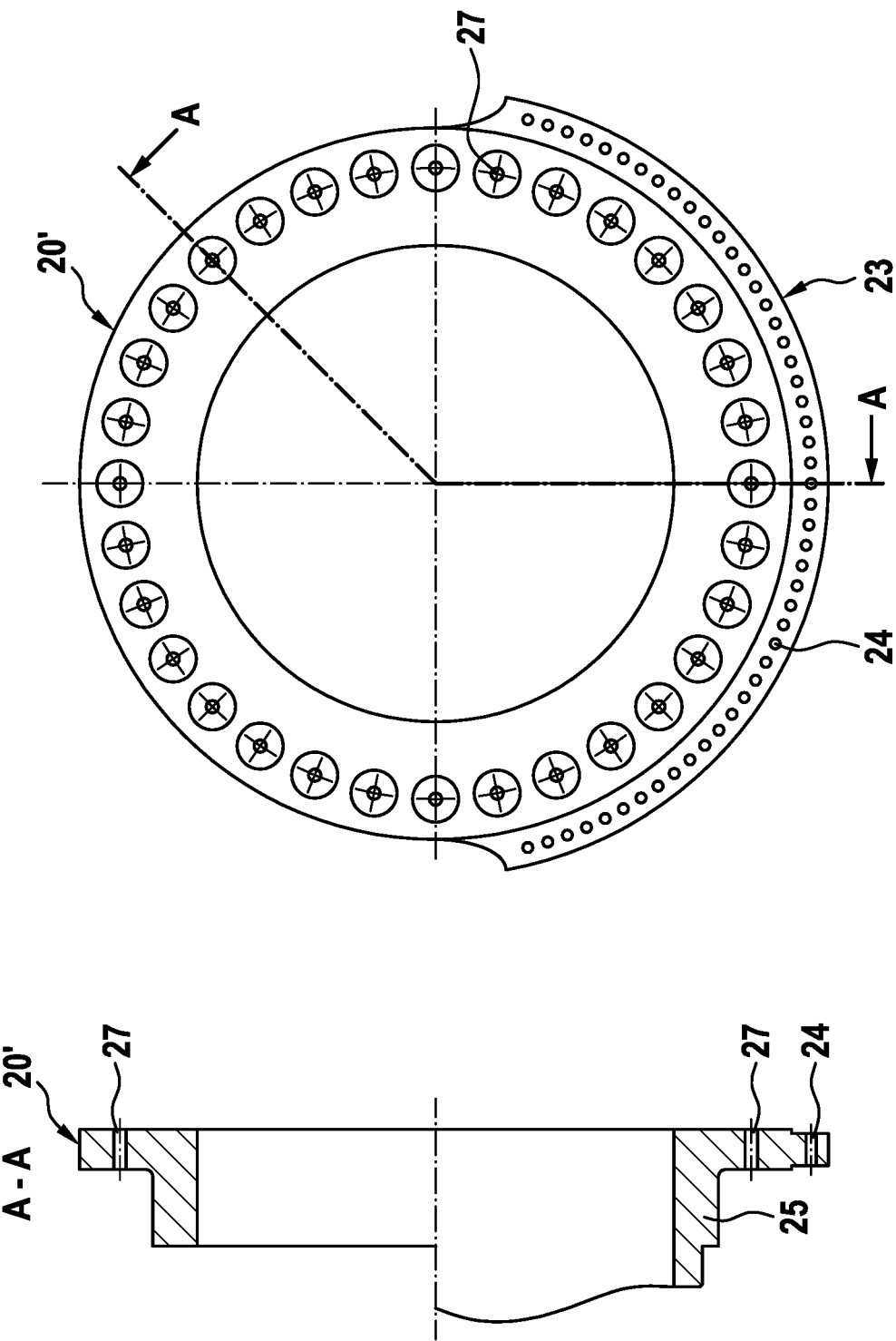
FIG. 4 is a detail view of the other ring element of the arrangement from FIG. 1.

Represented in FIG. 4 is the other ring element 20' of the arrangement 1 from FIG. 1. The ring element 20' is realized as a fastening frame for the gearbox 52, and in particular for fastening the gearbox housing 54 thereto.

For this purpose, the ring element 20' has a radial drill pattern 27, at which the gearbox housing 54 can be fastened via elastic spacing elements 55 (see FIG. 1). The fastening in this case is configured such that, via the elastic spacing elements 55, the ring element 20' is decoupled from the vibrations of the gearbox 52.

The ring element 20' also has a stop face 23 which is matched to the shape of the stop face 15 of that bearing point 11' of the mainframe 10 at which the ring element 20' is to be fastened. Provided adjacently to this stop face 23, there is also a radial pattern of axial drilled through-holes 24 which likewise is matched to the corresponding pattern of drilled holes on the mainframe 10. In addition, an axial stiffening rib 25 is provided.

As represented in FIG. 1, the mainframe 10 may be mounted on a plate 60 that is rotatable about a vertical axis 61 so that the rotor of a wind turbine can thus be made to track the wind in the yaw direction.

The invention claimed is:

1. An arrangement for mounting the drivetrain of a wind turbine, comprising a mainframe for mounting the drivetrain, the mainframe including two bearing points that are spaced apart from each other, wherein at least one bearing point of the two bearing points comprises a partial flange having a fastening region, wherein the fastening region comprises a partial ring shaped segment having a central angle between about 30 degrees and about 280 degrees, wherein an axis of the central angle is aligned and substantially parallel with a main axis of the drivetrain when the mainframe is in use, wherein the partial flange is configured to support and configured to be fastened to a ring element at the fastening region, wherein the partial flange and/or the fastening region, shaped as a circular ring segment, of at least one bearing point comprises an angular segment of from 80° to 180°, and wherein the fastening region is configured for insertion of the ring element, the drivetrain, or a part of the drivetrain having the ring element mounted thereon in a radial direction into the at least one bearing point, and the ring element configured to radially encompass the drivetrain as a fastening frame for a gearbox, the ring element being fastened to the fastening region, shaped as a partial ring shaped segment, of a bearing point of the mainframe.

2. The arrangement according to claim 1, wherein the partial flange is configured to be fastened to the ring element over an angular length of the fastening region.

3. The arrangement according to claim 2, wherein the fastening region shaped as a partial ring shaped segment has a radial stop face for the ring element.

4. The arrangement according to claim 1, wherein the fastening region shaped as a partial ring shaped segment has a radial stop face for the ring element.

5. The arrangement according to claim 1, wherein the partial flange has a radial stop face for the ring element that is shaped other than as a circle segment.

6. The arrangement according to claim 1, wherein the fastening region shaped as a circular ring segment has a multiplicity of drilled holes for axial screwed connection to the ring element.

7. The arrangement according to claim 1, wherein the ring element is realized as a bearing housing having a bearing seat.

8. The arrangement according to claim 7, wherein a roller bearing is arranged in the bearing seat.

9. The arrangement according to claim 8 wherein the roller bearing is selected from the group consisting of a pendulum bearing, a cylinder bearing, a tapered roller bearing and a toroidal bearing.

10. The arrangement according to claim 1, wherein elastic coupling elements, for vibration decoupling of the gearbox, are provided at the fastening frame.

11. The arrangement according to claim 1, wherein the ring element is connected to a fastening region of a bearing point of the mainframe by a screwed connection.

12. The arrangement according to claim 1, wherein the ring element has an axial stiffening rib.

13. The arrangement according to claim 1, wherein the arrangement comprises the drivetrain of a wind turbine and the ring element being arranged coaxially around a rotor shaft of the drivetrain.

14. A wind turbine having a drivetrain that comprises a rotor shaft and a gearbox, wherein the drivetrain is mounted by means of an arrangement according to claim 1.

15. The arrangement according to claim 1, wherein the partial flange has a radial stop face for the ring element that is elliptical or trough-shaped.

16. The arrangement according to claim 1, wherein the fastening region shaped as a circular ring segment has a multiplicity of drilled holes, arranged in a radial drill pattern, for axial screwed connection to a ring element.

17. An arrangement for mounting the drivetrain of a wind turbine, comprising a mainframe for mounting the drivetrain, the mainframe including two bearing points that are spaced apart from each other, wherein at least one bearing point of the two bearing points comprises a partial flange having a fastening region, wherein the fastening region comprises a partial ring shaped segment having a central angle between about 30 degrees and about 280 degrees, wherein an axis of the central angle is aligned and substantially parallel with a main axis of the drivetrain when the mainframe is in use, wherein the partial flange is configured to support and configured to be fastened to a ring element at the fastening region, wherein the partial flange and/or the fastening region, shaped as a circular ring segment, of at least one bearing point comprises an angular segment of from 80° to 180°, and wherein the fastening region is configured for insertion of the ring element, the drivetrain, or a part of the drivetrain having the ring element mounted thereon in a radial direction into the at least one bearing point, and the ring element configured to radially encompass a majority of the drivetrain and serve as a mounting point for a gearbox, the ring element being fastened to the fastening region, shaped as a partial ring shaped segment, of a bearing point of the mainframe.

* * * * *